Feb. 4, 1930.    J. H. WAGENHORST    1,745,919
VEHICLE WHEEL
Filed June 1, 1926
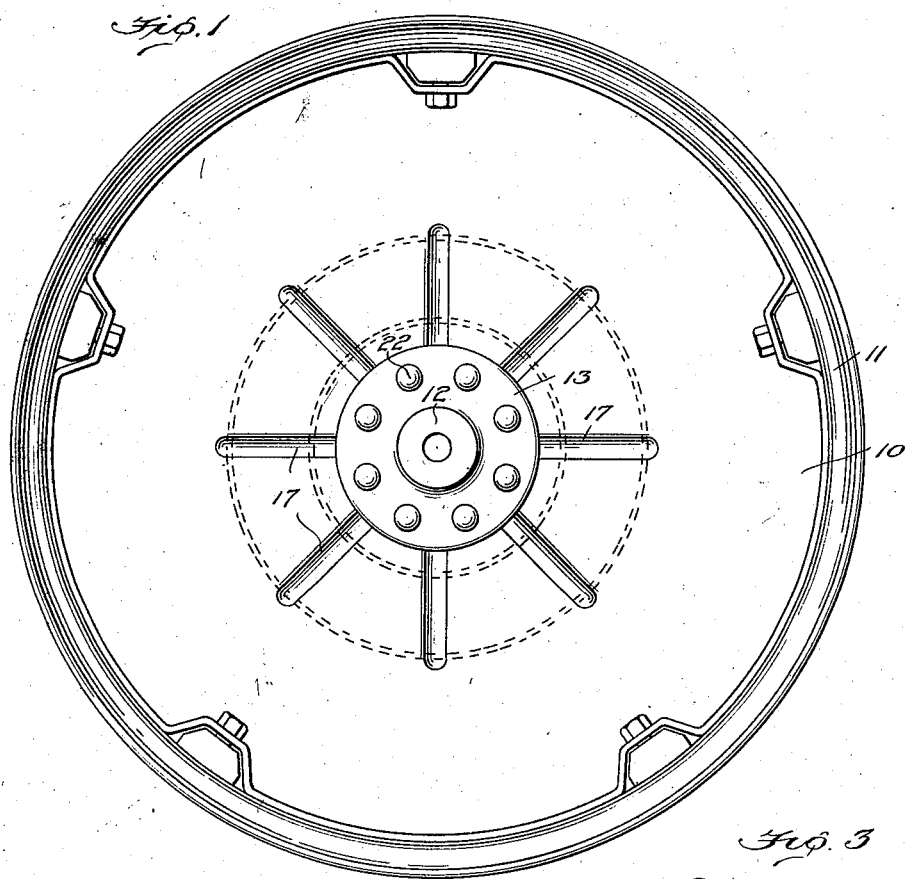
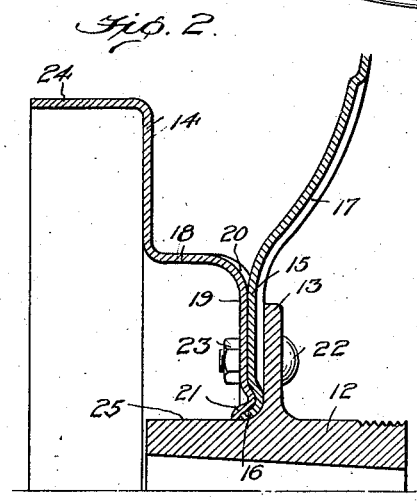
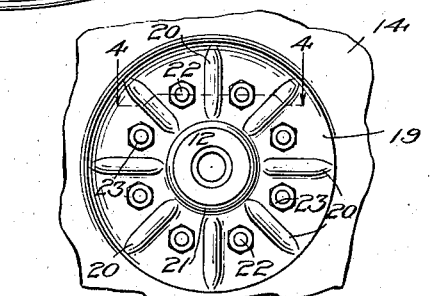
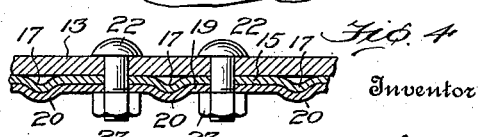
Inventor
James H. Wagenhorst
By Church & Church, Attorneys Patented Feb. 4, 1930

1,745,919

UNITED STATES PATENT OFFICE

JAMES H. WAGENHORST, OF JACKSON, MICHIGAN

VEHICLE WHEEL

Original application filed September 23, 1922, Serial No. 589,983, and in Canada August 25, 1925. Divided and this application filed June 1, 1926. Serial No. 112,827.

My invention relates to improvements in vehicle wheels and has to do, more particularly, with an improved connection between a wheel disk, a hub and a brake-drum.

This application is a division of my pending application for improvements in automobile wheels, Serial No. 589,983, filed September 23, 1922.

The principal object of my invention is to provide a wheel construction having an improved formation of the disk and the brake-drum, which results in an improved connection between the wheel disk, the hub and the brake-drum giving greater strength of construction, simplicity of manufacture and economy of material. An object of my invention is to provide a wheel construction in which the central portion of the wheel disk is reinforced and a brake construction in which the central portion of the brake-drum is stiffened and made stronger, and which results in an interlocking connection between the brake-drum and the wheel disk so that the strains and stresses incident to the application of the brakes are transmitted directly from the brake-drum to the wheel disk and the bolts connecting these parts are relieved of the greater portion of this strain.

Further objects, and objects relating to details and economies of construction and operation, will definitely appear from the detailed description to follow. In one instance, I accomplish the objects of my invention by the devices and means set forth in the following specification. My invention is clearly defined and pointed out in the appended claims. A structure constituting a preferred embodiment of my invention is illustrated in the accompanying drawings, forming a part of this specification, in which:

Figure 1 is a view in front elevation of a disk wheel embodying my invention.

Fig. 2 is a vertical, sectional view through the central portion of the wheel disk, hub and brake-drum.

Fig. 3 is a fragmentary view, in rear elevation, of the central portion of the brake-drum and Fig. 4 is a detail, sectional view taken on the lines 4—4 of Fig. 3.

In the drawings, the same reference numerals refer to the same parts throughout the several views and the sectional view is taken looking in the direction of the arrows at the ends of the section line.

In general, I accomplish the objects of my invention by providing the brake-drum with a central offset portion having a vertical wall which is offset from the main plane of the brake-drum and which engages the central portion of the wheel disk and may be connected thereto. I propose to provide both the disk and the central portion of the brake-drum with radial corrugations which are so formed that they fit each other and which are held in interlocking engagement with each other by the fastening means which extends through the disk and the brake-drum.

The embodiment of my invention illustrated in the drawings comprises a wheel disk 10 upon the periphery of which a demountable rim 11 is mounted. My invention, of course, is applicable to disk wheels of the type having a rim permanently attached to the periphery thereof. The wheel hub 12 is provided with a radially extending flange 13, similar in formation to the spoke flanges commonly employed in connection with wood spoke wheels. The brake-drum has the usual cylindrical braking surface 24 and a vertical wall 14 which is offset outwardly at 18 forming the central vertical portion 19 extending parallel to the wall 14 but offset therefrom a considerable distance as best shown in Fig. 2. The wheel disk 10 has a central portion 15 which lies in a vertical plane and surrounds the central opening in the disk. The edge portion of the disk immediately surrounding the central opening may be curved rearwardly to form the flange 16, as shown in Fig. 2. I have provided the disk with radially extending corrugations 17 which extend from points about midway between the central opening in the disk and its periphery to a point immediately adjacent the central opening therein, and I have provided the offset portion 19 of the brake-drum with corresponding radial corrugations 20 which are so formed as to fit over the corrugations in the disk, as shown in Fig. 4.

The disk 10 is mounted upon the cylindrical barrel portion 25 of the hub with the curved flange 16 seated on said barrel and with the plane portion 15 of the disk in contact with the rear face of the radially extending hub flange 13. The brake-drum is mounted with its offset portion 19 in contact with the plane portion of the disk and with the corrugations 20 fitting over the corrugations 17 of the disk, as shown in Figs. 2 and 4. The brake-drum is provided with a central opening which receives the barrel of the hub and may be provided with a curved flange 21 surrounding this central opening, which fits over the curved flange 16 of the disk and seats upon the barrel 25 of the hub, as shown in Fig. 2. The hub, disk and brake-drum are connected together by means of bolts 22 passing through the hub flange 13, the plane portion 15 of the disk and the offset portion 19 of the brake-drum and having nuts 23 screwed thereon. These bolts preferably pass through the parts between the radial corrugations, as best shown in Fig. 3.

The provision of the central offset portion strengthens the brake-drum materially and reinforces it against the strains imposed upon it, which are often quite severe in practice. Furthermore, this offset portion simplifies very much the construction of the hub, reduces the amount of material necessary to form the hub and eliminates the necessity of any fillers between the disk and the brake-drum. The radial corrugations formed in the central portion of the brake-drum also assist materially in strengthening and stiffening it and the radial corrugations formed in the central portion of the disk have the same effect upon that part of the structure. Furthermore, since the corrugations in the brake-drum interlock with the corrugations of the disk, the torque resulting from the application of the brakes is transmitted directly from the brake-drum to the wheel disk and the bolts 22 and nuts 23 merely serve to clamp the parts together and are not relied upon to resist these stresses and strains resulting from the application of the brakes. This makes a very simple and cheap construction but one which is exceptionally strong and efficient in practice.

I am aware that the invention disclosed herein may be varied considerably without departure from the spirit thereof, and, therefore, I claim the invention broadly as indicated by the appended claims.

What I claim is:

1. In a vehicle wheel, the combination of a hub having a radial flange and a cylindrical barrel in the rear of said flange, a wheel disk having a central opening, a plane portion surrounding said central opening and fitting against said flange and provided with radially extending corrugations, the portions of said disk immediately surrounding said central opening being rearwardly curved to form a flange mounted on the barrel of said hub, a brake-drum having a central portion offset to form a vertical wall fitting against the central plane portion of said disk and having radial corrugations interlocking with the corrugations of said disk, said brake-drum having a rearwardly curved flange immediately adjacent the central opening and fitting the cylindrical barrel of said hub, and means connecting said brake-drum, disk and hub together.

2. In a vehicle wheel, the combination of a hub having a radial flange and a cylindrical barrel in the rear of said flange, a wheel disk having a central opening, a plane portion surrounding said central opening and fitting against said flange and provided with radially extending corrugations, the portions of said disk immediately surrounding said central opening being rearwardly curved to form a flange mounted on the barrel of said hub, a brake drum having a central portion offset to form a vertical wall fitting against the central plane portion of said disk and having radial corrugations interlocking with the corrugations of said disk, and means connecting said brake drum, disk and hub together.

JAMES H. WAGENHORST.